United States Patent
Baumgartner et al.

(10) Patent No.: US 7,641,025 B2
(45) Date of Patent: Jan. 5, 2010

(54) DISC BRAKE HAVING AN ELECTRICALLY DRIVEN ADJUSTING DEVICE

(75) Inventors: Johann Baumgartner, Moosburg (DE); Wolfgang Pahle, Heilbronn (DE); Dirk Ganzhorn, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 578 days.

(21) Appl. No.: 10/504,533

(22) PCT Filed: Jan. 17, 2003

(86) PCT No.: PCT/EP03/00437

§ 371 (c)(1),
(2), (4) Date: Jul. 11, 2005

(87) PCT Pub. No.: WO03/069180

PCT Pub. Date: Aug. 21, 2003

(65) Prior Publication Data

US 2006/0151262 A1  Jul. 13, 2006

(30) Foreign Application Priority Data

Feb. 13, 2002 (DE) .................. 102 06 078
Nov. 11, 2002 (DE) .................. 102 52 301

(51) Int. Cl.
*B60T 13/74* (2006.01)
(52) U.S. Cl. .................. 188/71.8; 188/162; 188/196 B
(58) Field of Classification Search ............. 188/71.7, 188/71.8, 71.9, 162, 196 B
See application file for complete search history.

(56) References Cited

U.S. PATENT DOCUMENTS

| 2,476,237 | A | * | 7/1949 | Buffington | ............... | 188/79.63 |
| 3,059,731 | A | | 10/1962 | Gancel et al. | | |
| 3,371,753 | A | * | 3/1968 | Meier | ........................ | 188/347 |
| 3,618,714 | A | * | 11/1971 | Croswell | ................... | 188/71.8 |
| 4,804,073 | A | | 2/1989 | Taig et al. | | |
| 6,012,556 | A | | 1/2000 | Blosch et al. | | |
| 6,234,587 | B1 | | 5/2001 | Gerum et al. | | |
| 6,250,434 | B1 | | 6/2001 | Baumgartner et al. | | |
| 6,311,807 | B1 | | 11/2001 | Rinsma | | |

FOREIGN PATENT DOCUMENTS

| DE | 11 99 552 B | 8/1965 |
| DE | 37 16 202 A1 | 11/1988 |
| DE | 196 54 729 A1 | 12/1996 |
| DE | 197 56 519 A1 | 10/1998 |
| EP | 0 534 987 B1 | 8/1994 |
| EP | 0 982 210 A | 3/2000 |
| EP | 0 995 921 A | 4/2000 |
| WO | WO 97 30294 A | 8/1997 |
| WO | WO 99/05428 | 2/1999 |
| WO | WO 99/60285 | * 11/1999 |

* cited by examiner

*Primary Examiner*—Bradley T King
(74) *Attorney, Agent, or Firm*—Crowell & Moring LLP (57) ABSTRACT

A disc brake is provided, especially for utility vehicles, that comprises a caliper that overlaps a brake disc, a brake application device disposed in the caliper that applies the brake and at least one adjustment device comprising an electrical drive. The disc brake is further provided with a mechanical device that blocks the adjustment device driven by an electromotor against an augmentation of the release play that exceeds a threshold value caused by the electromotor drive.

27 Claims, 12 Drawing Sheets

DISC BRAKE HAVING AN ELECTRICALLY DRIVEN ADJUSTING DEVICE

BACKGROUND AND SUMMARY OF THE INVENTION

The invention relates to a disc brake, particularly for commercial vehicles, having a caliper straddling a brake disc, an electromechanically or pneumatically operable application device arranged in the caliper for applying the brake, and at least one adjusting device with an electric-motor drive for compensating brake pad wear by adjusting the release play of the disc brake. In particular, the disc brake has at least one electric-motor-driven adjusting rotating device on each side of the brake disc, each of which act by way of at least one pressure piece upon a respective brake pad on each side of the brake disc.

Disc brakes with adjusting systems operated by an electric motor are known per se; such as, for example, from German Patent documents DE 197 56 519 A1 and DE 37 16 202 A1 or International Patent document WO 99/05428.

The use of an electric adjusting motor for driving the adjusting device of the disc brake has been successful per se. In comparison to normal mechanical wear adjusting systems, disc brakes with an electromechanical adjusting device have the advantage that an unacceptably reduced release play (for example, as a result of a thermal expansion of the brake pads) can be augmented again by rotating back the adjusting rotating devices.

In the event of a servicing, the adjusting rotating devices can advantageously be returned automatically into their initial position by means of the electronic control of the adjusting device, thus allowing for the replacement of the worn-out brake pads with new ones.

However, this basic advantage of the electromechanical wear adjusting systems has the problem that it must be designed to preclude the initiation of an unacceptably large resetting as a result of an error in the hardware or software of the electronic control system or by an external influence on the latter.

Although, because of a correspondingly error-tolerant construction of the electronic control system and of the pertaining software, the occurrence of this error can be considered to be virtually excluded, additional protection measures are required because of the serious consequences of this error in the event of any, however improbable, occurrence.

It is therefore an object of the invention to further develop the disc brake of the above-mentioned type such that an unacceptably large reversed rotation of the adjusting rotating devices is reliably prevented.

The invention achieves this task by providing a mechanical device for blocking the electric-motor-driven adjusting setting devices with respect to an augmentation of the release play by the electric-motor drive which exceeds a limit value.

Advantageous further developments are described and claimed herein.

According to the invention, the disc brake has a mechanically operating device that blocks the electric-motor-driven adjusting devices—for example, adjusting rotating devices or drives—with respect to a threshold-exceeding augmentation (increase) of the release play by the electric-motor drive. Completely independent of operations in the electronic system (such as an ABS or EBS control unit of the brake), it therefore becomes possible that, during the normal operation of the brake, a reversed rotation, for example, of the adjusting rotating devices beyond a certain permissible amount is prevented by a mechanical blocking of the adjusting devices.

This invention is particularly suitable for a disc brake, in which at least one adjusting device, respectively, is arranged on each side of the brake disc so that, for compensating brake pad wear, the brake pads on both sides of the brake disc can be adjusted. In this case, the adjusting device(s) can each have at least one or two adjusting rotating device(s).

The blocking forces of the blocking device are preferably proportioned to be at least large enough so that the electric motor drive, or the drives of the adjusting device, cannot overcome the blocking forces and are maintained immobile with respect to the maximal driving torque. As a result, an unintended augmentation of the release play is reliably avoided.

During servicing, the blocking of the adjusting devices is temporarily canceled in order to permit the setting-back of the screws to allow for the exchanging of the brake pads.

The mechanical blockage of the reversed rotation can occur at the driving motors themselves, in the adjusting gearing, or at the adjusting rotating devices.

The blocking by way of the adjusting rotating devices is particularly advantageously achieved in that the adjusting rotating devices are connected with the brake pads for transmitting pull-back forces, and the brake pads are mutually coupled such that, although they can be moved toward one another by the adjusting system in the event of the occurrence of wear, a mutual moving-apart of the brake pads is permitted only to a predefined extent.

In a supplementary fashion, an electronically acting device can be provided for blocking the electric-motor-driven adjusting setting device(s) with respect to an unintentional augmentation of the release play by the electric-motor drive—for example, designed as a corresponding controlling and/or regulating process for controlling the adjusting devices—so that the mechanical blocking device only represents a fall-back (fail-safe) device in the event of a failure of the electronic blocking device.

The mechanical blocking device can be implemented in an uncomplicated manner in various fashions.

The mechanical device for blocking the electric-motor-driven adjusting device is preferably implemented by a mechanical reversed-rotation blocking at the electric-motor drive, particularly at a driving motor, on a gearing, or on the adjusting rotating devices. In this case, it is particularly contemplated to construct the reversed-rotation blocking on the adjusting rotating devices.

In an embodiment, a free wheel is arranged on a shaft end of the respective driving motor, which free wheel permits a rotating movement of the driving motor in the application direction of the adjusting rotating device, but has a blocking effect in the reversed-rotation direction.

In order to permit a slight reversing of the adjusting rotating devices, according to a variant, the housing of the free wheel can be connected with an elastic element, such as a flat coil spring. In this manner, when the motor shaft is moved by a reversed rotation, the flat coil spring is first wound up by way of, optionally, several rotations before a further rotation of the motor shaft is prevented by means of the free wheel and the pretensioned flat coil spring acting upon the latter. The outer end of the flat coil spring is connected with the caliper and can be uncoupled therefrom. For changing the brake pads, the fixing of the outer end of the flat coil spring can be released by a manual operation, so that a reversed rotation of the adjusting rotating devices is permitted.

Instead of using the flat coil spring, a limited reversing can also be achieved by combining a free wheel with a screwing element. In this case, the housing of the free wheel is axially displaceably but non-rotatably accommodated in a sleeve which has an external thread on its outside diameter, with which external thread, it engages with an internal thread in the caliper.

When the free wheel now locks during a reversed-rotating movement of the engine shaft, the free wheel rotates the outer sleeve into the internal thread receiving it and, in the process, moves this sleeve in the axial direction by way of, optionally, several rotations against a stop. When the stop has been reached, a further rotating movement is prevented.

The two above-described reversed-rotation securing mechanisms, as well as contemplated equivalent embodiments thereof, in the same manner as on the motor shaft, can be arranged on each shaft of the adjusting gearing connected on the output side. Corresponding to the ratio to the shaft of the driving motor, a smaller angle of rotation is required while the adjusting forces are correspondingly larger.

In a further preferred manner, the pressure pieces are connected with pad holding plates.

This solution utilizes the fact that the adjusting pistons for achieving an active release of the brake pads after the braking operation are mechanically coupled with the respectively acted-upon brake pad in the sense of a transmission of a reversing movement. This mechanical coupling can take place in a form-locking manner (for example, mutually engaging profiles of the pressure element and of the back of the brake pad), in a material-locking manner (gluing, welding, etc.) or in a force-locking manner (for example, by way of clamp springs).

If the two brake pads are now mutually connected by way of a second coupling device such that, although they can be moved toward one another for the purpose of the wear adjustment, a moving-apart is prevented starting from a predefined amount in the second coupling device, the adjusting rotating devices of the internal as well as of the external adjusting device are thereby blocked.

As mentioned above, a blocking of the screws can be implemented by way of coupled brake pads. In a particularly preferred manner, the two brake pads are coupled with one another in a constructively simpler and more cost-effective fashion such that, for the purpose of the wear adjustment, they can be moved toward one another but can be moved away from one another only by not more than a small predefined amount. In this manner, the brake pads are mutually coupled such that, although in the event of an occurrence of wear, the brake pads can be moved toward one another by means of the adjusting device on both sides of the brake disc, a moving-apart of the brake pads is permitted only by way of a predefined path.

The brake pad holding device oftentimes consists of a brake pad holding clamp which extends at a right angle with respect to the friction surfaces of the brake disc beyond the latter and the brake pads and is supported at both ends on the caliper. The brake pad holding clamp presses the two brake pads by way of the brake pad holding springs placed upon these brake pads against the supporting surfaces in the brake pad guide of the caliper. The coupling device can therefore be constructed on a brake pad holding clamp, which extends at a right angle with respect to the friction surfaces of the brake disc beyond the latter and the brake pads and is supported at both ends on the caliper. The brake pad holding clamp presses the two brake pads by way of the brake pad holding spring placed upon the latter against the supporting surfaces in the brake pad guide of the caliper. In this manner, a particularly secure blocking device is implemented in a particularly cost-effective fashion.

The brake pad holding clamp is, preferably, axially movably accommodated in abutments at the caliper, and/or, on its surface facing the brake pads is equipped with a profiling, particularly with a saw-toothed profile, in the areas in which the brake pad holding springs are supported against the brake pad holding clamp. The additional costs of the construction as a result of the construction of the blocking device are kept particularly low in this manner while the operating reliability is excellent.

The profiling preferably has two profiling sections oriented in opposite directions, so that a displacing of the brake pads in the direction of the brake disc can take place with relatively little force, whereas a moving-away of the brake pads from the brake disc can be implemented only by means of a greater force as a result of the profilings.

Projections engaging in the profiling are preferably constructed on the brake pad holding springs, and the brake pad holding springs are received with an axial play on the brake pads.

In another embodiment of the invention, the brake pad holding clamp is axially movably received in its abutments at the caliper; for example, with an axial displaceability of approximately 2 mm. By means of a controlling of the internal and external adjusting devices in opposite directions, it becomes possible in this manner to push the entire unit consisting of the brake disc and brake pad holding clamp/brake pad set back and forth in this area without changing the total release play and the claw-type connection between the brake pad holding clamp and the brake pad holding springs.

It is also contemplated that the profiled sections are arranged in a component that is itself arranged between the brake pad holding clamp and the brake pad holding springs. The component is displaceable relative to the brake pad holding clamp.

This function is important in the case of fixed-caliper brakes with an external wear adjustment and a micro-displaceable brake disc.

Embodiments of the invention are also contemplated in which the second coupling device is constructed to be separate, that is, not combined with the brake pad holding device. For example, the brake pads can be coupled by way of a cylinder-piston element, in which case the cylinder (or the two cylinders) is fastened to the first brake pad, and the piston (or the two pistons) is fastened to the brake pad which is, in each case, situated opposite the brake disc. Here, the piston end can be equipped with elastic projections which engage in corresponding profilings, such as circling sawtooth grooves in the internal cylinder surfaces.

However, preferably a continuously operating reversed-rotation securing mechanism can also be created by means of the cylinder-piston combination. This can be implemented by means of clamping mechanisms which, in principle, operate similarly to the described mechanical locking. However, preferably, a free wheel is arranged on the pin-shaped end of the piston, which free wheel carries a non-self-locking thread on its enveloping housing, which thread engages in a complementary internal thread in the cylinder. The free wheel is accommodated in a secured manner on the piston pin for transmitting axial forces. The locking direction of the free wheel is selected such that the brake pads can be moved toward one another at a relatively low expenditure of force. However, the free wheel locks when the brake pads are moving apart, so that no relative movement takes place in the thread. A slight reverse movement is permitted by a play in the thread or in the axial securing of the free wheel.

Advantageous further developments of the invention are described and claimed herein.

In the following, the invention will be explained in detail with reference to the attached figures.

DETAILED DESCRIPTION OF THE DRAWINGS

Figure 1:
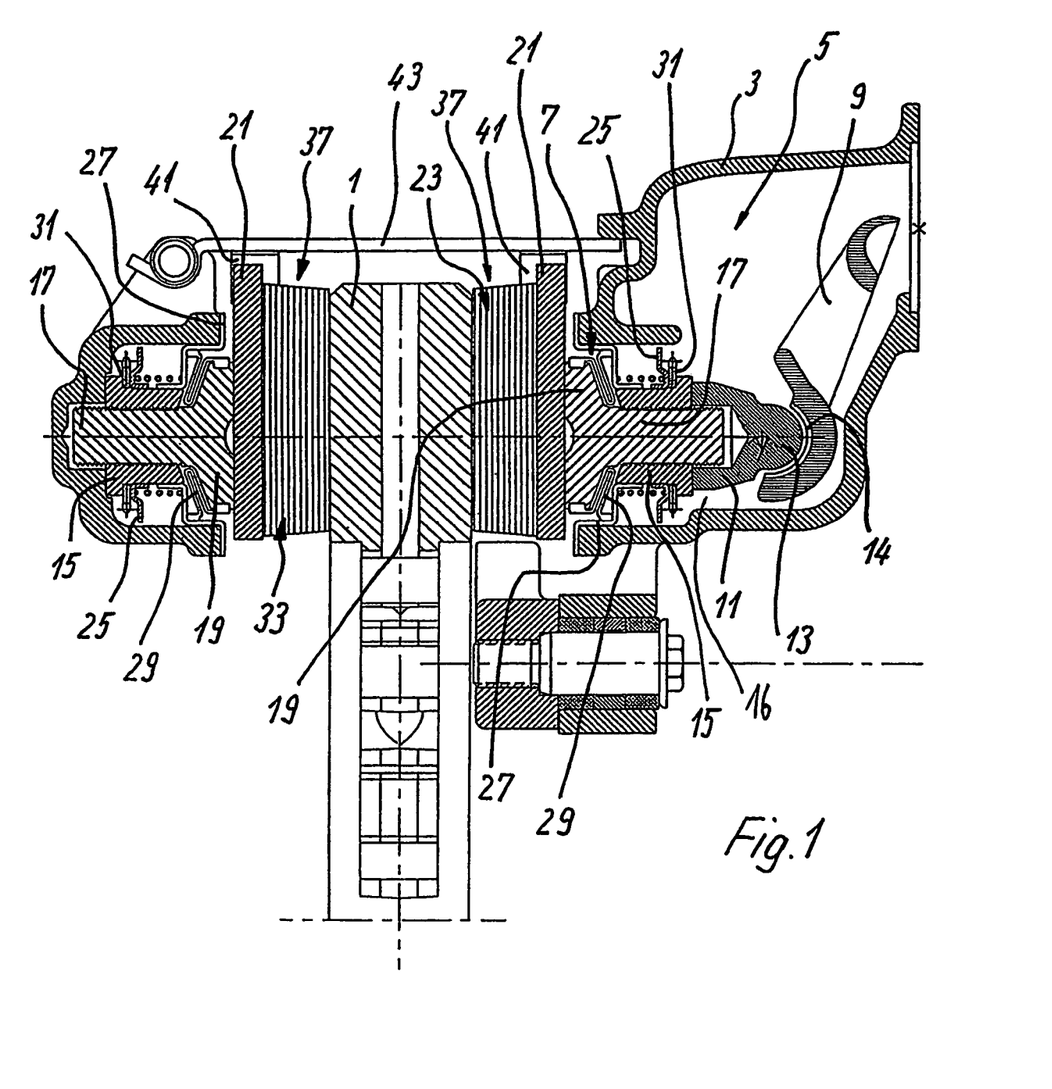
FIG. 1 is a sectional view of a disc brake without a blocking device.

First, the basic construction of the disc brake according to FIG. 1 is described in order to explain an exemplary construction of a disc brake with electromagnetically operated adjusting devices on both faces of the brake disc.

FIG. 1 is a sectional view of a sliding-caliper disc brake having a caliper, which here consists of one piece, that overlaps a brake disc 1. As an alternative, the invention can also be used with fixed-caliper disc brakes or with hinged-caliper disc brakes. It is also particularly suitable for pneumatically operated brakes (with a pneumatically operated cylinder) or also for purely mechanically operated brakes where, under certain circumstances, the adjusting device and the application device are combined with one another.

As an alternative, the caliper 3 can also be constructed in two parts (not illustrated here). In this case, the two caliper parts are then preferably mutually connected by studs, and preferably one of the two caliper parts frames the brake disc in its upper circumferential area, and the other caliper part is used for receiving the application device, which permits a simple adaptation of the brake to many different types of application devices.

On one side of the brake disc 1, an application device 5 is arranged in the caliper 3, which application device 5 can be inserted (also completely or partially preassembled) into the caliper 3 through an opening 7 of the caliper 3 that faces toward the brake disc.

The application device 5 has a rotary lever 9, which can be operated by a piston rod (not shown here). The rotary lever 9 is supported on the caliper 3 by way of bearing elements, such as balls, which are not visible, and additional bearing shells.

On its side facing away from the caliper 3, the rotary lever 9 in each case acts upon an intermediate element 11 at a central point or, preferably, at two lateral ends. The intermediate element 11 has a hemispherical attachment 13 at its end facing the rotary lever. A slide bearing shell 14 is arranged between the attachment 13 and the rotary lever 9.

The intermediate element 11 is supported on the face of an adjusting nut 15 into which an adjusting screw 17 is inserted, in particular it is screwed in. The adjusting screw 17 carries a pressure piece 19 at its end facing away from the rotary lever 9, which pressure piece rests on a brake pad holding plate 21 of an application-side brake pad 23.

When the rotary lever 9 is swivelled by advancing the piston rod (not visible here), the lower eccentric-type end of the rotary lever 9 causes an advancing movement of the intermediate element 11 in the direction of the brake disc 1. In this case, the adjusting nut 15 and the adjusting screw 17 are also pressed in the direction of the brake pad 23, and the application-side brake pad 23 is displaced in the direction of the brake disc 1.

The adjusting nut 15 and the adjusting screw 17 are inserted into two holding plates 25, 27. A bellows-type seal 29 seals-off the space between the one holding plate 25 and the pressure piece to prevent penetration of dirt and moisture.

A gearwheel 31 is fastened on the adjusting nut in a non-rotatable manner relative to the adjusting nut. The gearwheel can be operated by way of additional gearing members, such as additional gearwheels (in particular, by an electric motor not illustrated here), in order to compensate the brake pad wear caused by braking.

When the adjusting nut 15 is rotated, the adjusting screw 17 is moved axially relative to the adjusting nut 15 and the release play between the brake pad and the brake disc is thereby changed. As an alternative, a like operation by way of a coupling mechanism (not shown here) connected between the rotary lever 9 and the adjusting nut 15 is also contemplated.

Preferably, two of the adjusting rotating devices 16—consisting of the adjusting nut 15 and the adjusting screw 17—are arranged side-by-side on each side of the application device 5, so that the brake lining is pressed at two points.

Two additional adjusting rotating devices 16 with a, preferably, separate electric-motor drive are arranged on the side of the brake disc 1 facing away from the application device—the so-called "reaction side"—in the caliper 3. These adjusting rotating devices 16 also each have an adjusting nut 15 and an adjusting screw 17, which permit the displacing of the pressure piece 19 in the direction of the brake pad 33, which is arranged on the reaction side of the brake disc 1, in the direction of the brake disc 1.

The adjusting of the release play preferably takes place in a computer-controlled manner.

Since at least one separate adjusting device (here, in each case, the adjusting device includes two adjusting rotating devices with an electric-motor drive) is arranged on each face of the brake disc 1, it becomes possible to construct the caliper 3 here as a sliding or hinged caliper. Such a caliper can have a sliding path or swivelling angle dimensioned such that less than the maximal adjusting path, particularly even only the maximal working stroke can be bridged by the sliding path or swiveling angle when the brake is applied.

For this purpose, the caliper 3 is swivellably or slidably fastened relative to a wheel axle (or wheel hub relative to the latter) on an elastic bearing. In a supplementary fashion, the brake disc 1 can also be slidably fastened to the wheel axle or wheel hub. Since the sliding path or swivelling angle to be bridged is smaller that the sliding path or the swivelling angle which a comparable caliper according to the state of the art had to bridge (in the case of which an adjusting device was arranged only on one side of the brake disc), it surprisingly becomes possible to implement the slidability or the swivel-lability by an elastic linkage between the caliper and the wheel hub or wheel axle.

In this case, the elastic bearing is arranged parallel to the axis of symmetry of the brake disc. This means that essentially no swivelling movement takes place about a bearing axis of rotation, but rather an elastic longitudinal displacement of the caliper takes place with an elastic swivellability transversely to the longitudinal axis of the ultra-bush, which ultra-bush can be used here, for example, as the bearing. Here, the movement of the caliper for compensating the elasticity is not implemented exclusively as a swivelling movement, whereby particularly adaptation braking takes place with an almost pure longitudinal displacement of the caliper, and only the rarely occurring braking at high braking forces requires the swivelling of the caliper. As an alternative, two bearings with swivelling axes parallel to the disc axis of rotation (not shown here) can also be provided.

It is important here that the adjusting devices are driven by electric motors; for example, by electric motors between two rotating screws on each side of the brake disc or outside the caliper, which are connected with the rotary drives by way of a driving connection not shown here.

Figure 2:
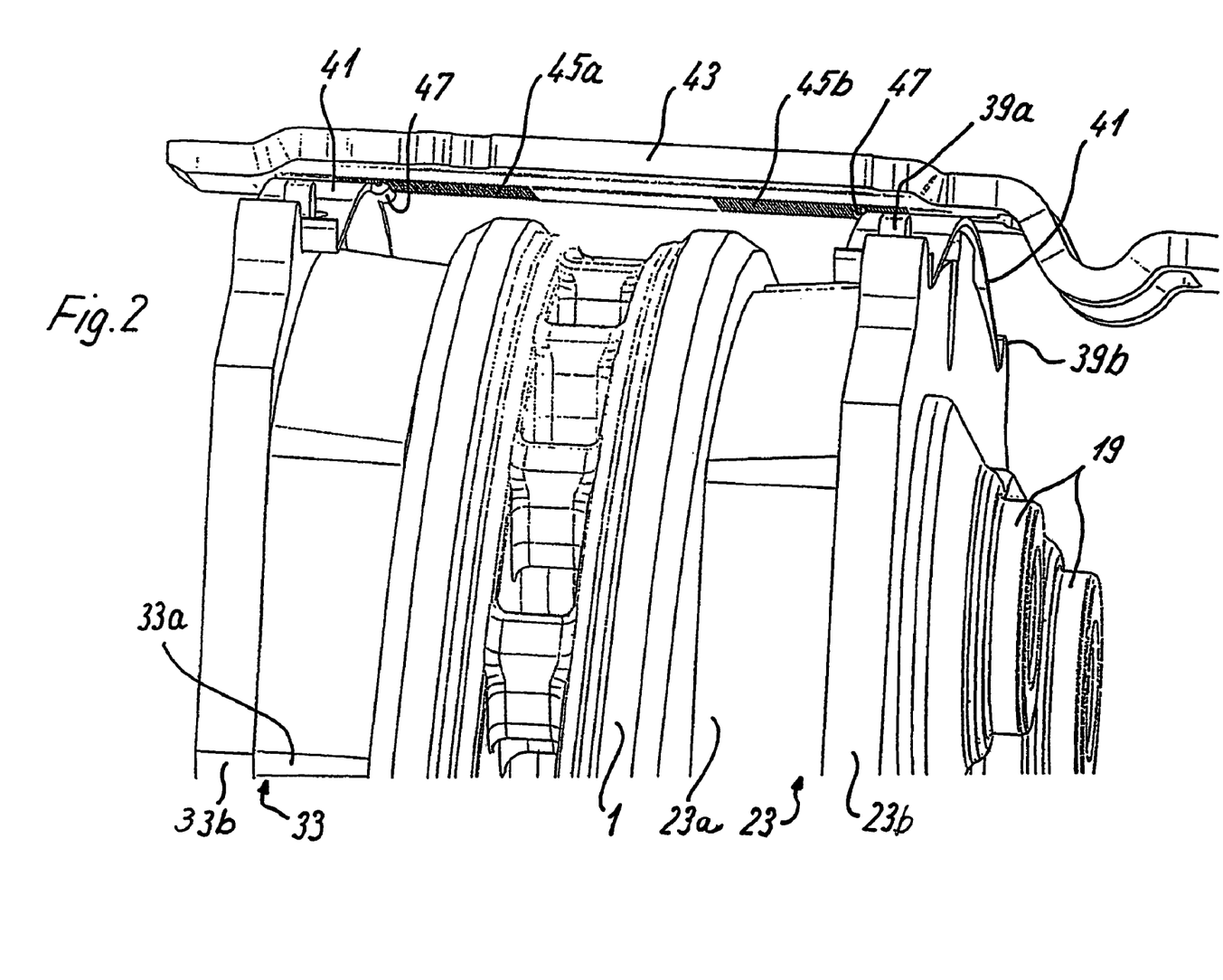
FIG. 2 is a sectional view of the upper circumferential area of components of a disc brake according to the invention with a blocking device.
Figure 3:
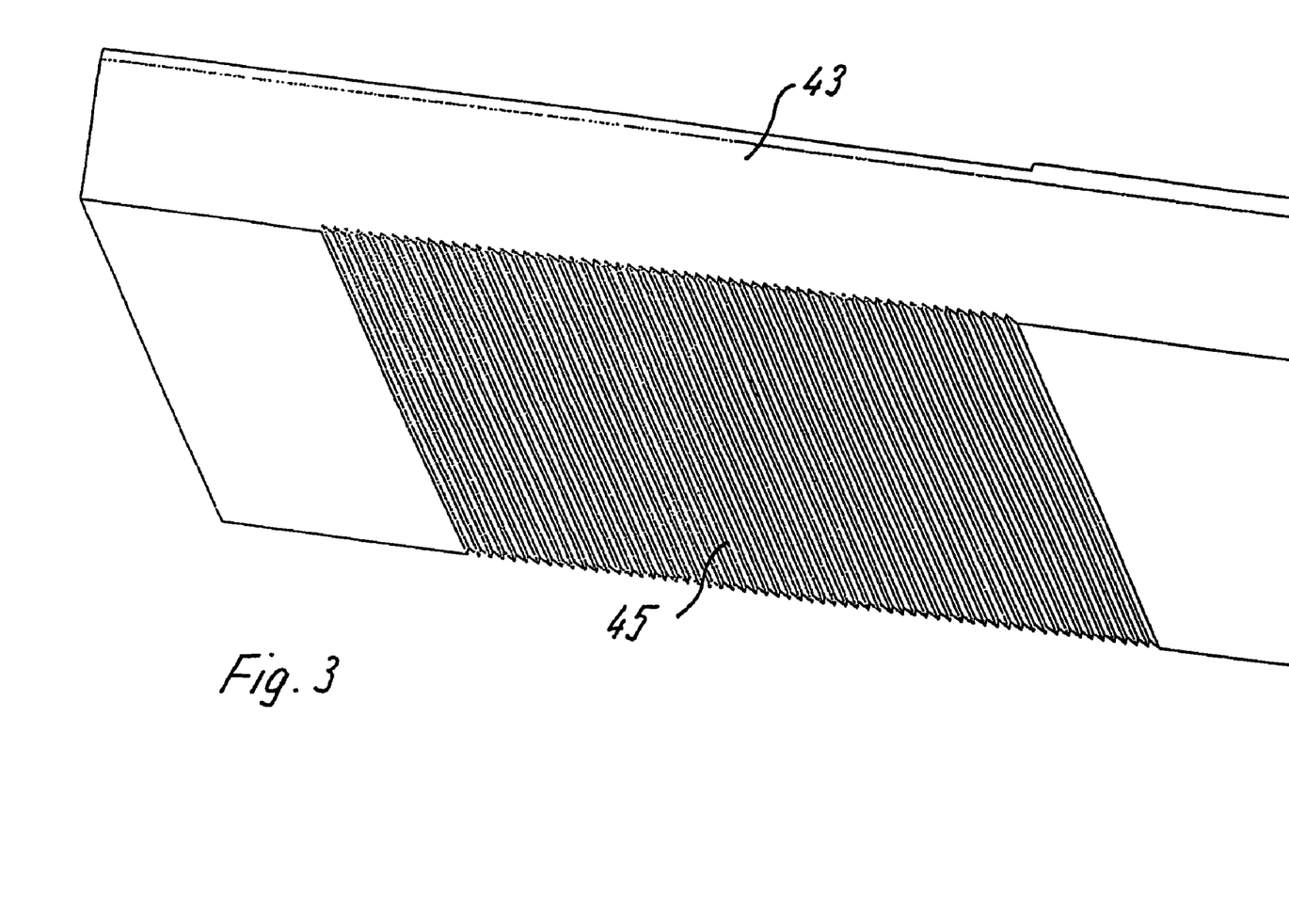
FIG. 3 is a perspective partial view of a brake pad holding clamp.
Figure 4:
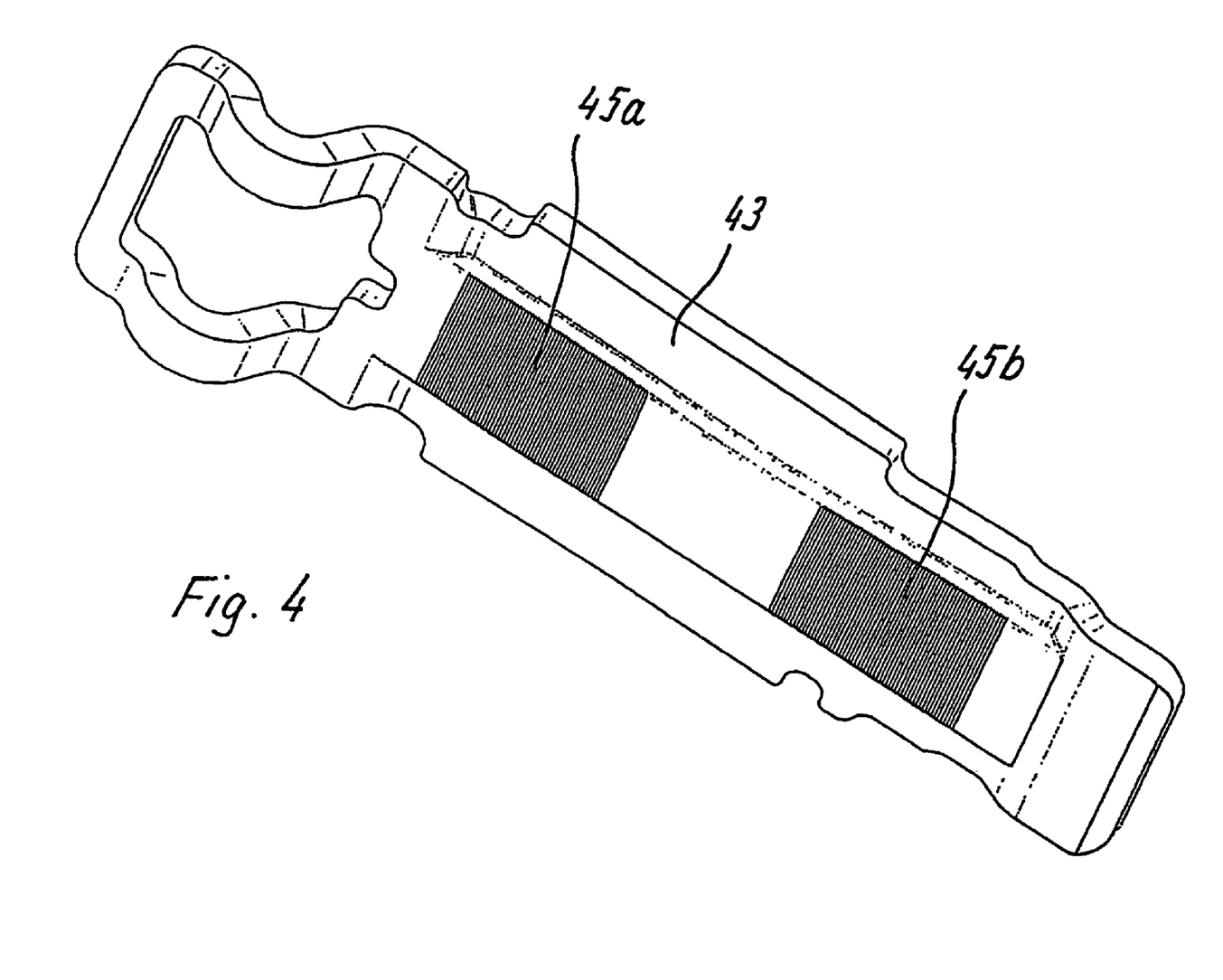
FIG. 4 is a perspective view of a brake pad holding clamp.
Figure 5:
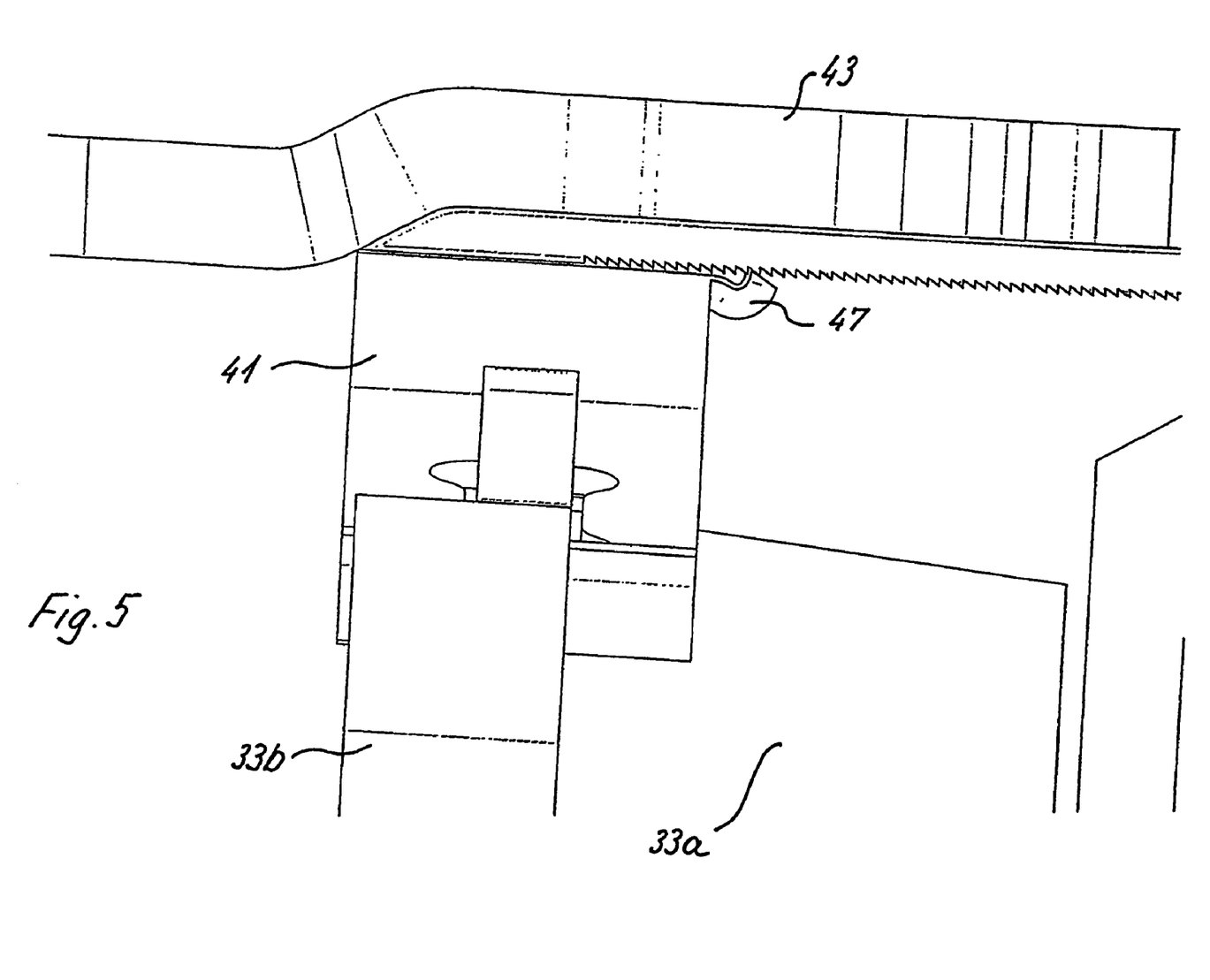
FIG. 5 is a cutout view of a disc brake according to the invention.
Figure 6:
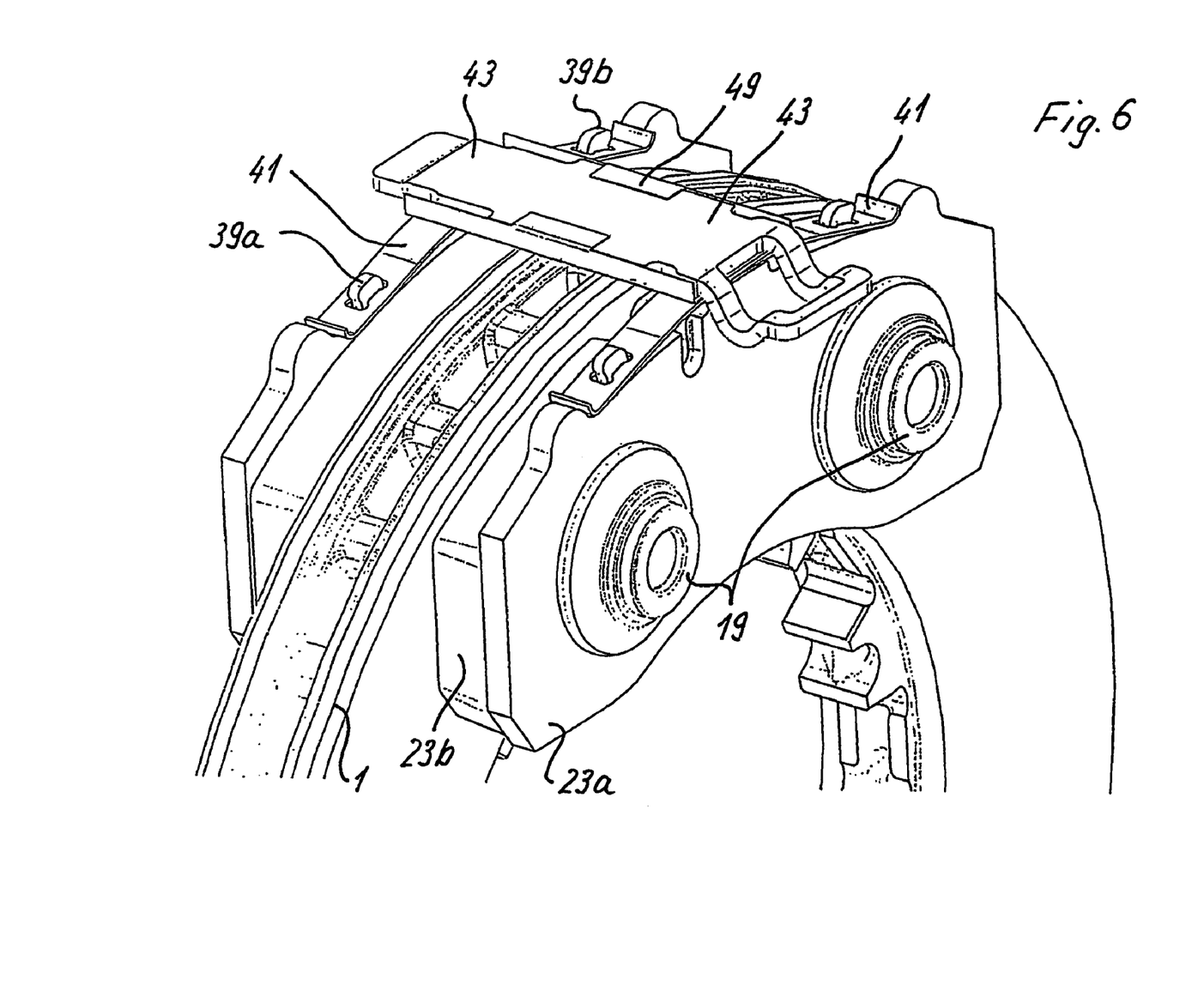
FIG. 6 is a view of an upper circumferential area of a brake disc, as well as of the brake pads, in addition to the brake pad holding clamp and the blocking device according to another embodiment of the invention.
Figure 7:
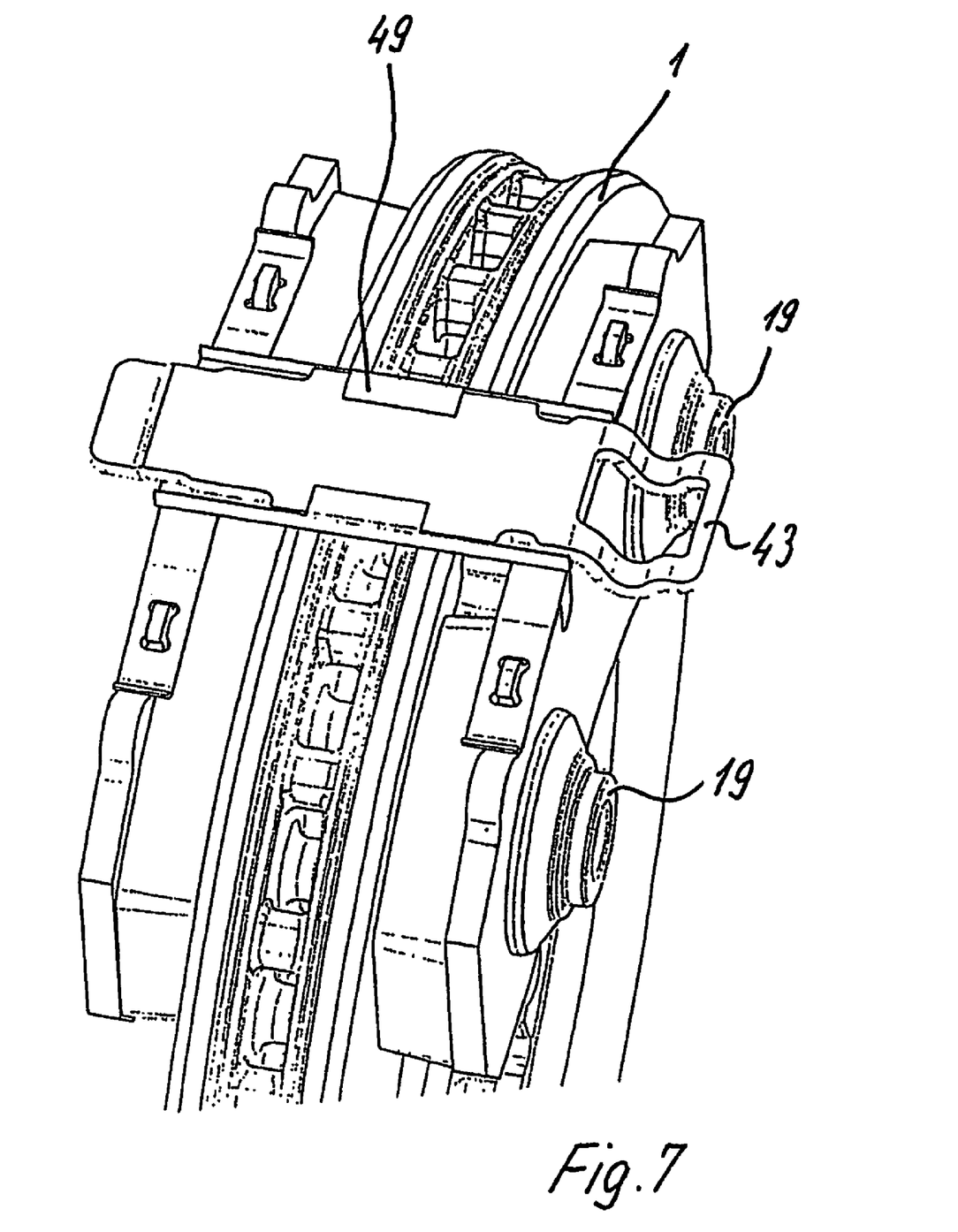
FIG. 7 is another perspective view of the components of FIG. 6.
Figure 8:
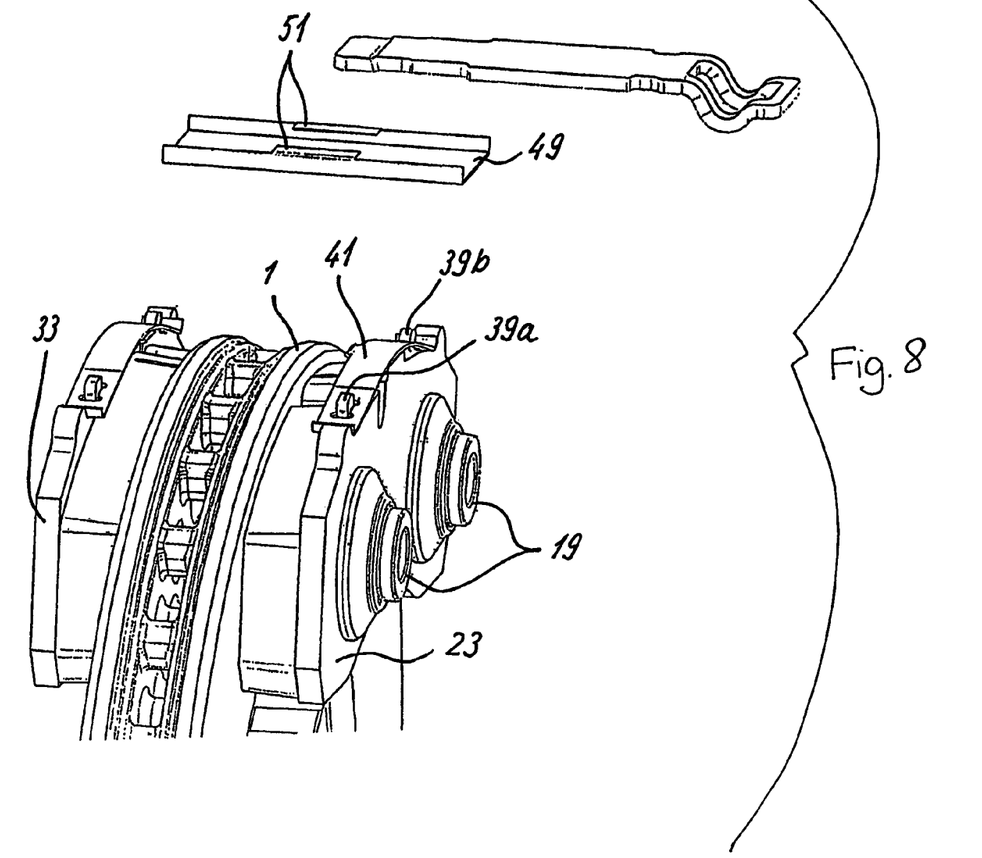
FIG. 8 is a partially exploded view of the components of FIG. 7.
Figure 9:
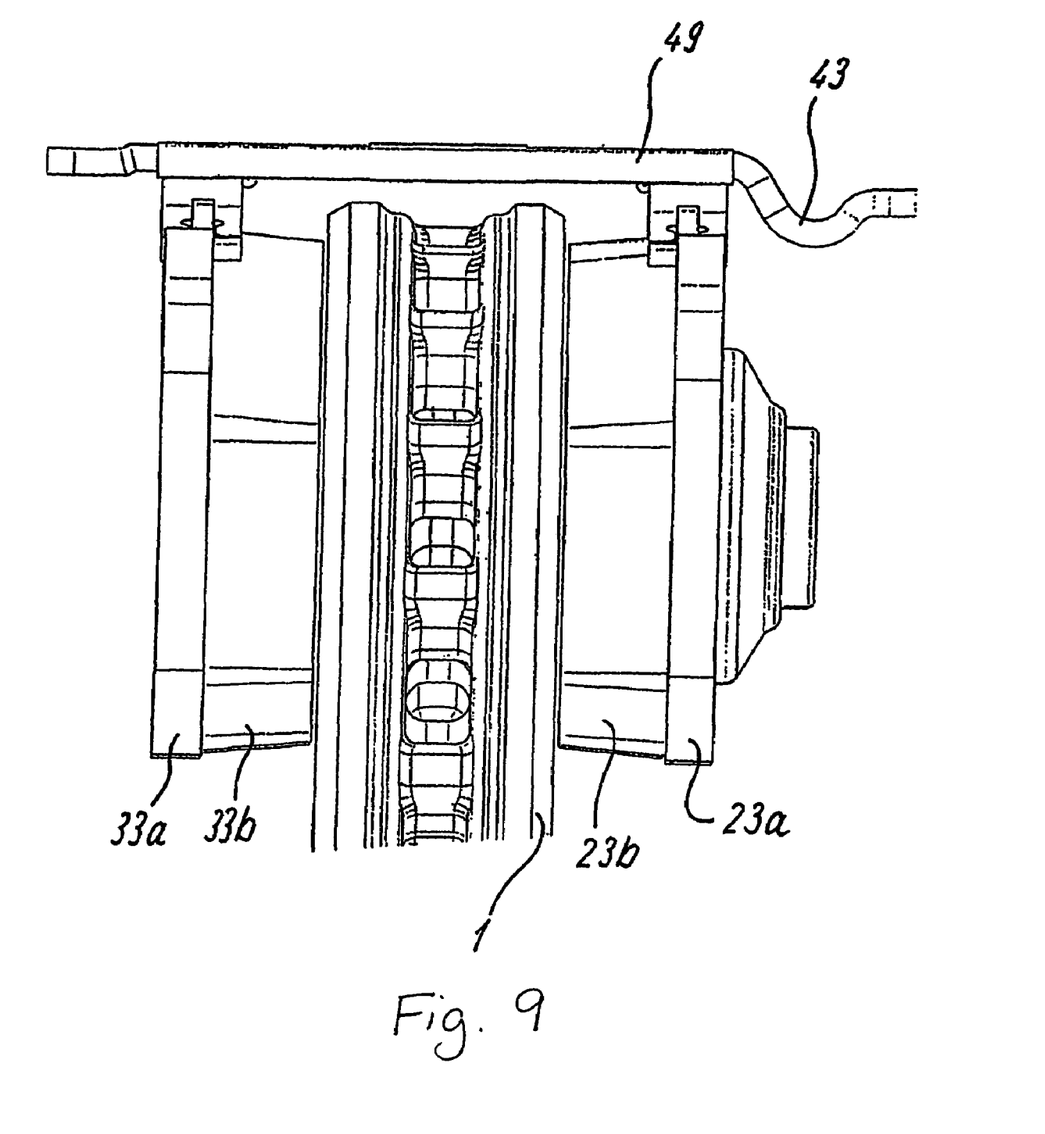
FIG. 9 is a lateral view of the components of FIG. 6.
Figure 10:
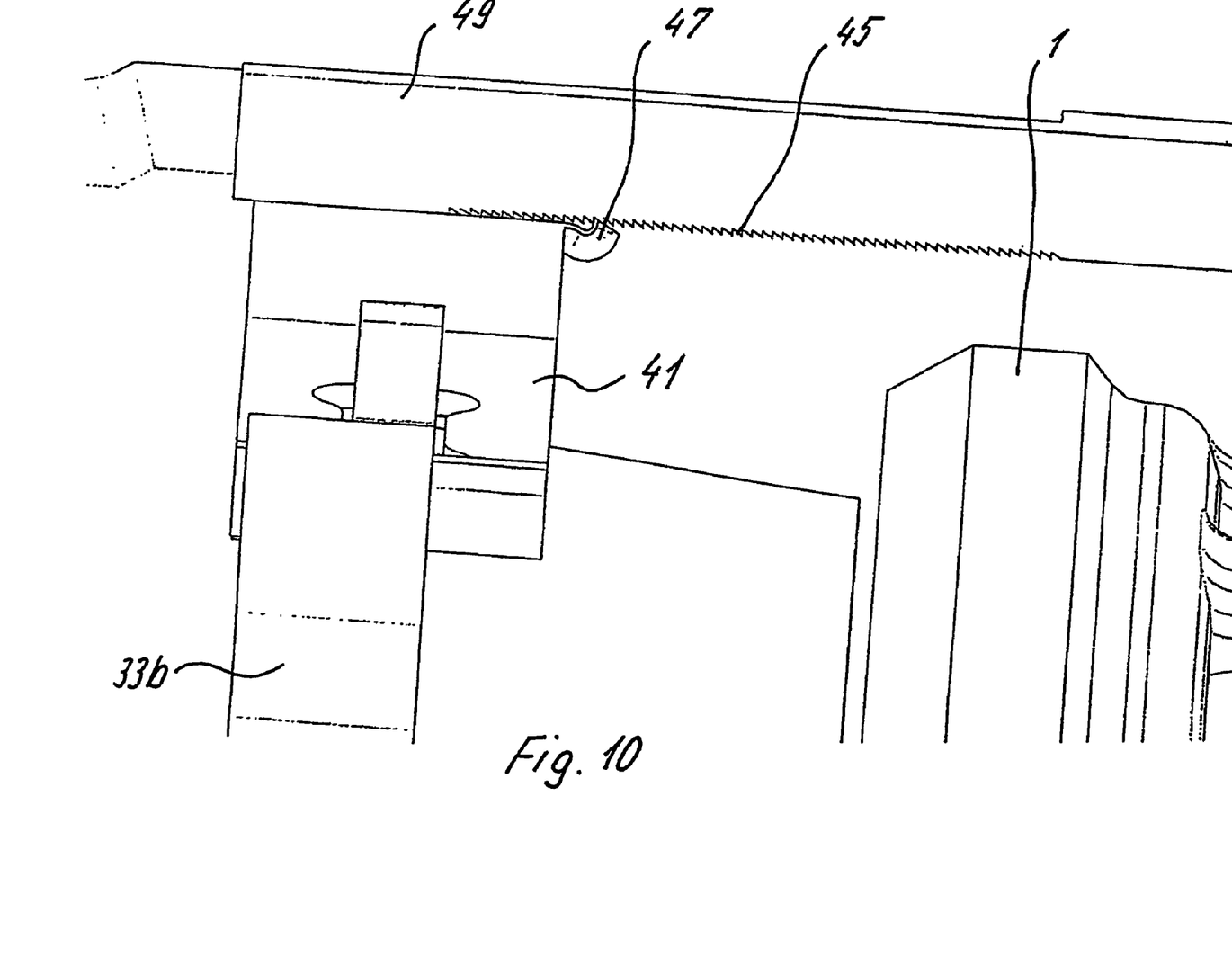
FIG. 10 is an enlarged cutout of FIG. 6.

FIG. 2 shows the upper circumferential area of the brake disc 1, in addition to the brake pads 23, 33 arranged on both sides of the brake disc 1. The brake pads 23, 33 each consist of brake pad material 23a, 33a and brake pad holding plates 23b, 33b. Two pressure pieces 19 arranged on both sides of the brake disc 1 in each case act upon the brake pad holding plates 23b, 33b.

In the installed position of FIG. 1, the brake pads are slid from above into brake pad shafts 37 of the disc brake. At their corresponding upper edge, the brake pad holding plates have two holding projections 39a, b for mounting a brake pad holding spring 41. In this case, the brake pad holding springs 41 are secured on both sides of the brake disc 1 by a brake pad holding clamp 43 oriented perpendicular to the brake disc plane to prevent them from falling out of the caliper opening in which the brake pads are slid (for the basic function of elements 39 to 41, see also European Patent document EP 0 534 987 B1).

The brake pad holding clamp 43 arranged at the caliper, for example, disposed or fastened, is provided with a sawtooth-type profiling on its side which is at the bottom in the installed position. This profiling 45 comprises two sawtooth-type profiling sections 45a, b, which are oriented in opposite directions with respect to one another. Projections 47 of the brake pad holding spring 41 engage in the profiling 45 such that a displacement of the brake pads can take place with the sawtooth profile, but not against the sawtooth profile. The combination of sawtooth profilings 45 and projections 47 thereby forms the mechanically operative device for blocking the electric-motor-driven adjusting setting devices with respect to an unintended augmenting of the release play by the electric-motor drive.

On its surface facing the brake pads 23, 33, the brake pad holding clamp 43 is provided with a profiling 45 in the areas in which the brake pad holding springs 41 are supported against the brake pad holding clamp 43.

In the contact area to the brake pad holding clamp 43, the brake pad holding springs 41 have projections 47 or profilings, which are opposed to the profilings in the brake pad holding clamp, so that these profilings are pressed into one another under the pretensioning force of the brake pad holding springs (not shown here). The profilings are designed such that displacement of the brake pads 23, 33 in the direction of the brake disc 1 can take place at a relatively low force, whereas a moving-away of the brake pads from the brake disc 1 is prevented by the mutually engaging profilings 45 of the brake pad holding clamp and the brake pad holding springs (not shown) (ratchet principle).

A slight movement of the brake pads 23, 33 away from the brake disc 1 is preferably permitted in that the brake pad holding springs 41 are accommodated on the brake pads 23, 33 with a certain axial play.

This variant of the invention can be implemented in a particularly cost-effective manner but is nevertheless operationally reliable.

According to FIGS. 6 to 10, the profiling 45 is not provided in the brake pad clamp 43 itself, but rather in a component 49 in the form of a sectionally U-shaped metal strip which is arranged between the brake pad holding clamp 43 and the brake pad holding springs 41 and frames the brake pad holding clamp 43. This metal strip reaches around the brake pad holding clamp 43 on its side which is on the bottom in the installed position, as well as laterally and, in sections, by means of two holding noses 51 also on the top side. In this case, the brake pad holding clamp 43 can be fixedly mounted on the caliper 3, and the axial displacing movement takes place between this additional component 49 and the brake pad holding clamp 43.

When the brake pad is exchanged, the reversed-rotation blocking is eliminated again by the releasing of the brake pad holding clamp, which has to be released anyhow during the exchange. In the case of other implementations of the reversed rotation protection, a corresponding manual release mechanism is to be provided for releasing the blocking.

Figure 11A:
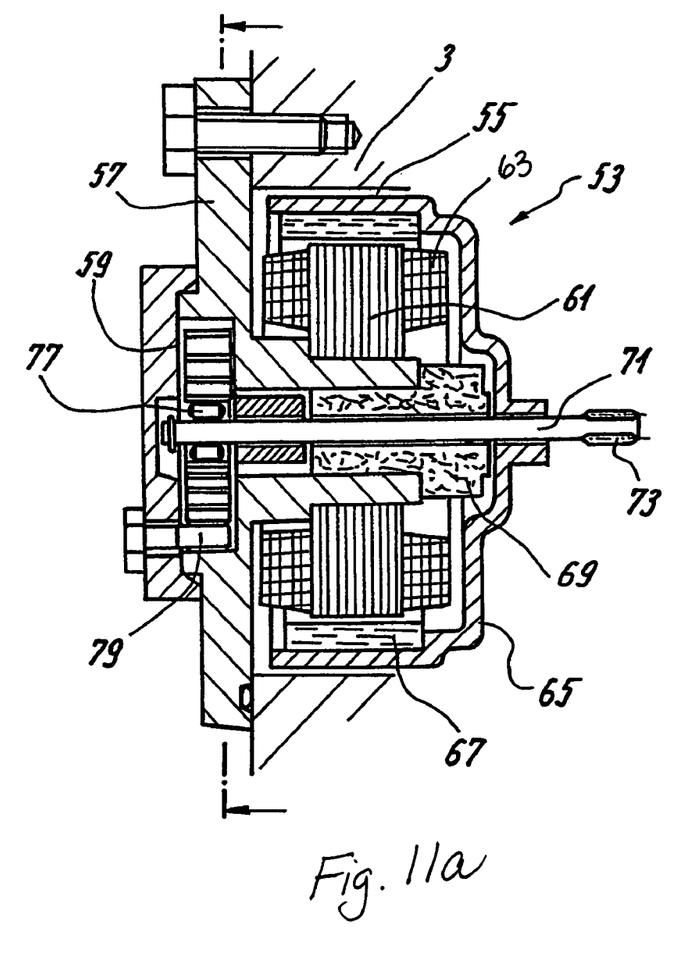
FIGS. 11A, 11B and 12 are sectional views of electric motors that function as the drive of the adjusting devices of additional embodiments of the invention.
Figure 11B:
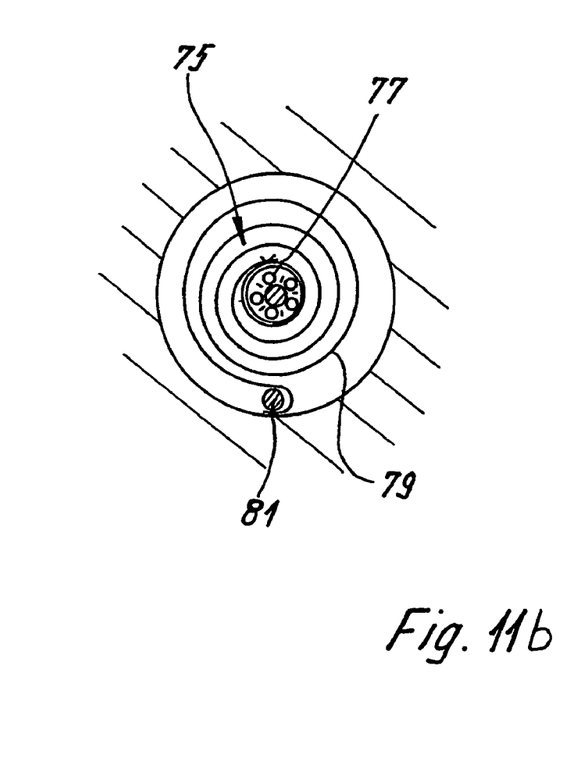
Figure 12:
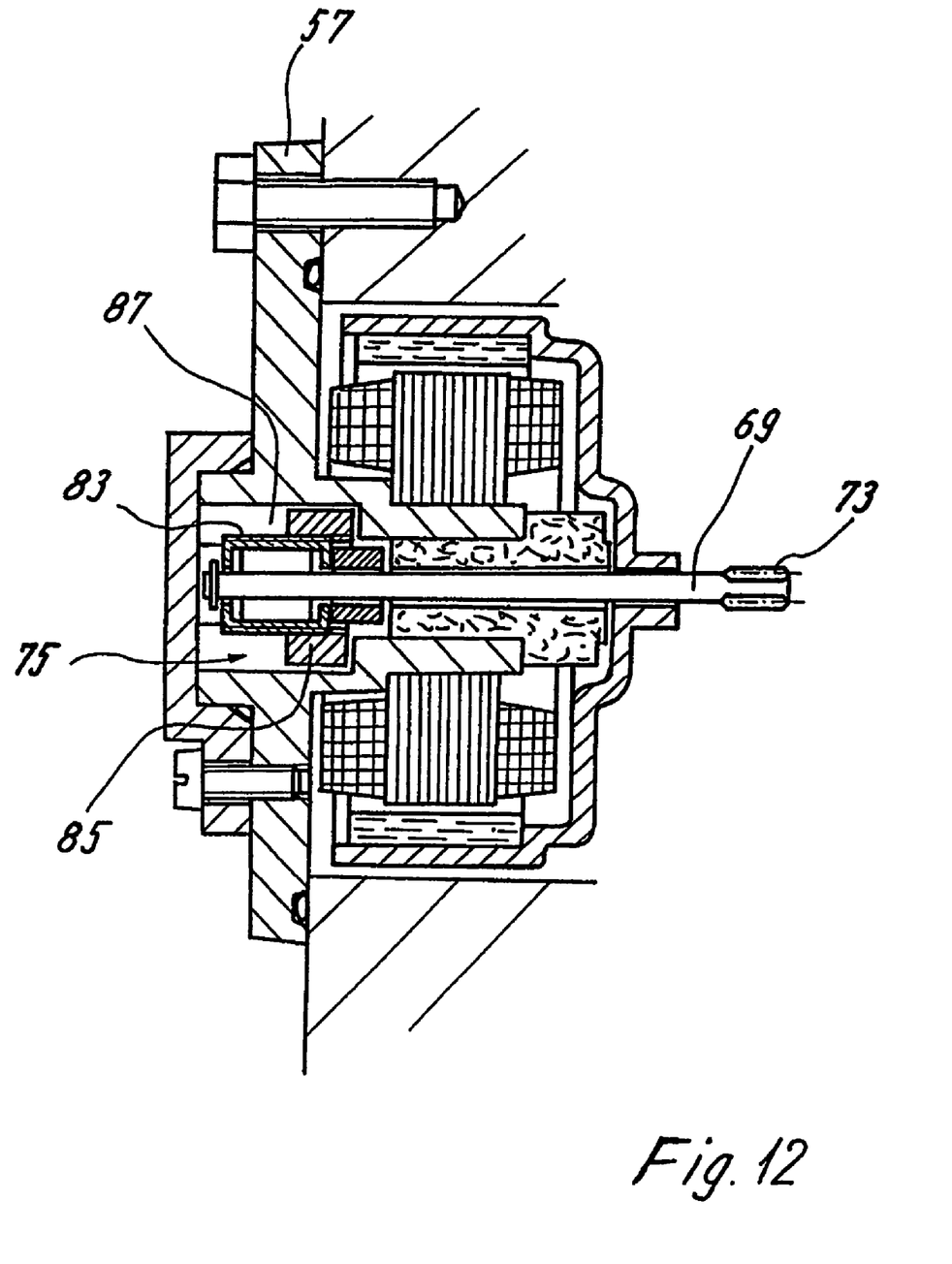

FIGS. 11 and 12 illustrate examples for implementing a device for blocking the electric-motor-driven adjusting device by way of a mechanical reversed-rotation blocking at the electric motor drive, particularly at a driving motor 53 of the drive.

EC motors are illustrated in each case, which are arranged in recesses 55 of a brake housing or caliper 3, the recesses 55 being closed toward the outside by an end shield 57 and a cover 59.

The EC motor includes a stator 61 with solenoids 63, as well as a rotor 65 with a permanent magnet 67. A slide bearing 69 is provided in which a shaft 71 is arranged. The shaft 71 has a driving pinion 73 for driving the adjusting device connected on the output side, for example, in the manner of FIG. 1.

For implementing the mechanical reversed-rotation blocking 75, at the end of the shaft 71 facing away from the driving pinion 73, this shaft 71 is surrounded by a clamp roller free wheel 77, which is arranged at the inside end of a flat coil or flat coil spring 79. The flat coil or flat coil spring 79 is fastened by means of a dowel pin 84 on the outer end on the end shield 57.

Thus, the path of the reversed rotation of the shaft 71 and, thus, also the path of the reversing of the adjusting devices is limited in a simple manner.

FIG. 12 differs from FIG. 11 in that an external thread is arranged on one end of a free wheel housing 83 of the clamp roller free wheel 77, which external thread meshes with the internal thread of a hexagon nut 85, which is non-rotatably but axially displaceably arranged on the thread 83 because it is arranged in a corresponding internal thread in a recess 87 of the end shield 57.

Since here the displacement path of the hexagon nut is limited by the free wheel in combination with the dimensions of the recess 87 in the end shield 57, a mechanical reversed-rotation blocking 75 is also implemented in a simple manner.

TABLE OF REFERENCE NUMBERS brake disc 1
caliper 3
brake application device 5 opening 7
rotary lever 9
intermediate element 11
hemispherical element 13
slide bearing shell 14
adjusting nut 15
adjusting rotating device 16
adjusting screw 17
pressure piece 19
brake pad holding plate 21
brake pad 23
brake pad material 23a, 33a
brake pad holding plate 23b, 33b
holding plates 25, 27
seal 29
gearwheel 31
brake pad 33
bearing 35
brake pad shafts 37
holding projections 39a, b
brake pad holding springs 41
brake pad holding clamp 43
profilings 45
projections 47
component 49
holding noses 51
driving motor 53
recess 55
end shield 57
cover 59
stator 61
solenoid 63
rotor 65
permanent magnet 67
sliding body 69
shaft 71
driving pinion 73
reversed-rotation blocking 75
flat coil spring 79
thread 83
nut 85
recess 87

The invention claimed is:

1. A disc brake having a brake disc, comprising:
a caliper straddling the brake disc;
a brake application device arranged in the caliper for applying a braking force;
adjusting devices having electric motor drives for compensating brake pad wear by adjusting a release play, one adjusting device being arranged on each side of the brake disc, wherein the adjusting devices are connected with the brake pads for transmitting pull-back forces;
a coupling device mutually coupling the brake pads such that, while being movable toward one another to compensate for wear, a moving apart from one another only occurs by way of a predefined path;
wherein the coupling device comprises:
a brake pad holding clamp extended beyond the brake disc and brake pads at a right angle with respect to friction surfaces of the brake disc, the brake pad holding clamp being supported at each end on the caliper;
wherein the brake pad holding clamp presses the two brake pads by way of a brake pad holding spring arranged on the brake pads against supporting surfaces in a brake pad guide of the caliper; and
wherein on a surface facing the brake pads, the brake pad holding clamp has a profiled section in areas in which corresponding brake pad holding springs are supported against the brake pad holding clamp via projections of the brake pad holding springs which engage in the profiling under a pretensioning force of the brake pad holding springs.

2. The disc brake according to claim 1, wherein at least one of said adjusting devices comprises at least one or two adjusting rotating devices.

3. The disc brake according to claim 1, wherein the coupling device provides blocking forces proportioned to be at least large enough that the electric motor drive of the adjusting device cannot overcome the blocking forces and is held in a stopped condition against a maximal driving torque of the electric motor drive.

4. The disc brake according to claim 1, further comprising a supplementary, electronically acting blocking device for blocking the adjusting device driven by the electric motor drive with respect to an unintended augmenting of the release play by the electric motor drive.

5. The disc brake according to claim 1, further comprising a blocking device providing a mechanical, reversed-rotation, blocking at the electric motor drive.

6. The disc brake according to claim 5, wherein the mechanical, reversed-rotation, blocking at the electric motor drive takes place on at least one of a driving motor, a gearing, and an adjusting rotating device.

7. The disc brake according to claim 1, further comprising a blocking device providing a mechanical reverse-rotation blocking occurring at an adjusting rotating device of the at least one adjusting device.

8. The disc brake according to claim 1, wherein on each side of the brake disc, each adjusting device acts by way of at least one pressure piece upon a respective brake pad on each side of the brake disc.

9. The disc brake according to claim 1, further comprising a blocking device having a free wheel arranged on a shaft end of the electric motor drive, said free wheel permitting a rotating movement of the electric motor drive in a brake application direction of the adjusting device but blocking the rotating movement in a reversed released direction of the adjusting device.

10. The disc brake according to claim 9, wherein the free wheel couples with an elastic element.

11. The disc brake according to claim 10, wherein the elastic element is a flat coil spring.

12. The disc brake according to claim 11, wherein an outer end of the flat coil spring is removably connected with the caliper.

13. The disc brake according to claim 9, wherein the free wheel has a screwing element.

14. The disc brake according to claim 1, wherein the brake pad holding clamp is axially movably accommodated in abutments on the caliper.

15. The disc brake according to claim 1, wherein the profiled section has sawtooth profile.

16. The disc brake according to claim 1, wherein the profiled section includes two profiled areas in which the profiling is oriented in opposite directions such that a displacement of the brake pads in the direction of the brake disc is implementable at a relatively low force whereas a displacement of the brake pads away from the brake disc is implementable only at a higher force due to the orientation of the profilings.

17. The disc brake according to claim 15, wherein the profiled section includes two profiled areas in which the profiling is oriented in opposite directions such that a displacement of the brake pads in the direction of the brake disc is implementable at a relatively low force whereas a displacement of the brake pads away from the brake disc is implementable only at a higher force due to the orientation of the profilings.

18. The disc brake according to claim 1, wherein the brake pad holding spring is accommodated on the brake pads with an axial play.

19. The disc brake according to claim 1, wherein the profiled section is formed in a separate component arranged between the brake pad holding clamp and the brake pad holding springs, the separate component being displaceable relative to the brake pad holding clamp.

20. The disc brake according to claim 8, wherein the pressure pieces are connected with the brake pad holding plates.

21. A wear adjustment system for an electromechanical or pneumatic disc brake for commercial vehicles, the disc brake including a caliper that straddles a brake disc, and a wear adjusting rotary device arranged on each side of the brake disc to act by way of a pressure piece upon a respective brake pad, the wear adjustment system comprising:
an electric motor drive for adjusting a release play of the brake disc to compensate for brake pad wear, the electric motor drive driving the wear adjusting rotary device;
a mechanical stop operably configured to prevent an increase of the release play driven by the electric motor drive in excess of a defined limit value;
wherein the mechanical stop comprises a coupling device for mutually coupling the brake pads on opposite sides of the brake disc to one another, the coupling device being operably configured such that the brake pads can move toward one another for wear adjustment but cannot be moved away from one another;
wherein the coupling device includes a brake pad holding clamp extending beyond the brake pads and the brake disc at substantially a right angle with respect to friction surfaces of the brake disc, the brake pad holding clamp being supported at each end on the caliper and acting to press the brake pads against their supporting surfaces by way of brake pad holding springs respectively assigned to each brake pad; and
wherein the brake pad holding clamp includes a profiling facing the brake pads in areas in which the brake pad holding springs are supported against the brake pad holding clamp via projections of the brake pad holding springs which engage in the profiling under a pretensioning force of the brake pad holding springs.

22. The wear adjustment system according to claim 21, further comprising a reverse rotation blocking arrangement constructed at the electric motor drive to block the electric motor drive from increasing the release play beyond the predefined limit value.

23. The wear adjustment system according to claim 21, further comprising a reverse rotation blocking arrangement constructed at the adjusting rotary drive to block an increase of the release play beyond the predefined limit value.

24. The wear adjustment system according to claim 22, wherein the reverse rotation blocking arrangement comprises a free wheel arranged on a shaft end of the electric motor drive, said free wheel permitting a rotational movement of the electric motor drive in an application direction of the adjusting rotary drive but blocking any rotating movement in a reversed rotating direction.

25. The wear adjustment system according to claim 21, wherein the brake pad holding clamp is axially movably accommodated in abutments on the caliper.

26. The wear adjustment system according to claim 21, wherein the profilings have a substantially sawtooth shape.

27. The wear adjustment system according to claim 21, wherein the profiling includes two profiled sections, each of which have their respective profilings oriented in opposite directions such that displacement of the brake pads in the direction of the brake disc can occur at relatively low force whereas displacement of the brake pads away from the brake disc can occur only at a higher force due to the orientation of the profilings.

* * * * *

UNITED STATES PATENT AND TRADEMARK OFFICE
CERTIFICATE OF CORRECTION

PATENT NO.       : 7,641,025 B2
APPLICATION NO.  : 10/504533
DATED            : January 5, 2010
INVENTOR(S)      : Baumgartner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Twenty-first Day of December, 2010

David J. Kappos
*Director of the United States Patent and Trademark Office*